United States Patent
Xu et al.

(10) Patent No.: US 12,470,275 B2
(45) Date of Patent: Nov. 11, 2025

(54) RADIO NETWORK NODE, AND METHOD PERFORMED THEREIN

(71) Applicant: Telefonaktiebolaget LM Ericsson (publ), Stockholm (SE)

(72) Inventors: Bo Xu, Täby (SE); Xueying Hou, Lund (SE); Anders Landström, Boden (SE); Peter Vaderna, Budapest (HU); Agnieszka Ziembla, Cracow (PL); Ricardo da Silva Souza, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 65 days.

(21) Appl. No.: 18/570,216

(22) PCT Filed: Jun. 16, 2021

(86) PCT No.: PCT/EP2021/066183
§ 371 (c)(1),
(2) Date: Dec. 14, 2023

(87) PCT Pub. No.: WO2022/262965
PCT Pub. Date: Dec. 22, 2022

(65) Prior Publication Data
US 2024/0291545 A1    Aug. 29, 2024

(51) Int. Cl.
*H04B 7/06*    (2006.01)
(52) U.S. Cl.
CPC .................. *H04B 7/0693* (2013.01)
(58) Field of Classification Search
CPC ........................... H04B 7/0693; H04B 7/0604
See application file for complete search history.

(56) References Cited

U.S. PATENT DOCUMENTS

| | | | |
|---|---|---|---|
| 2011/0261673 A1* | 10/2011 | Luo | H04J 11/0053 370/329 |
| 2011/0305295 A1* | 12/2011 | Kim | H04L 5/0053 375/295 |

(Continued)

FOREIGN PATENT DOCUMENTS

| | | |
|---|---|---|
| EP | 2622925 B1 | 1/2018 |
| WO | 2012041398 A1 | 4/2012 |
| WO | 2020118600 A1 | 6/2020 |

OTHER PUBLICATIONS

International Search Report and Written Opinion dated Mar. 14, 2022 for International Application No. PCT/EP2021/066183 filed Jun. 16, 2021; consisting of 11 pages.

(Continued)

*Primary Examiner* — Sung S Ahn
(74) *Attorney, Agent, or Firm* — Weisberg I.P. Law, P.A.

(57) ABSTRACT

Embodiments herein relate to method performed by a radio network node for handling communication in a wireless communication network. The radio network node dynamically applies different muting patterns for muting an active component of one or more antenna branches of the radio network node and/or of one or more antenna panels of the radio network node, wherein the different muting patterns are associated with one or more types of physical channels used for communicating and/or a communication parameter related to one or more UEs. The radio network node performs a communication using the dynamically applied different muting patterns.

19 Claims, 15 Drawing Sheets

(56) References Cited

U.S. PATENT DOCUMENTS

2013/0223416 A1\* 8/2013 Michel ............ H04W 72/0446
370/336
2021/0168714 A1 6/2021 Guan et al.

OTHER PUBLICATIONS

3GPP TSG RAN WG1#46 Tdoc R1-062378; Title: Frame structure for E-UTRA TDD mode; Agenda Item: 8.2; Source: IPWireless; Document for: Discussion; Date and Location: Aug. 28-Sep. 1, 2006, Tallinn, Estonia; consisting of 8 pages.
3GPP TS 45.002 V13.3.1; 3rd Generation Partnership Project; Technical Specification Group Radio Access Network; GSM/EDGE Multiplexing and multiple access on the radio path (Release 13); Sep. 2016; consisting of 140 pages.
3GPP TS 38.213 V16.2.0; 3rd Generation Partnership Project; Technical Specification Group Radio Access Network; NR; Physical layer procedures for control (Release 16); Jun. 2020; consisting of 176 pages.
Al-Husseiny, Z. et al.; Energy Efficiency LTE Site Operation with Antenna Muting and dynamic Psi-Omni; Uppsala Univeritet; Examensarbete 30 hp; Jun. 2014; consisting of 93 pages.

\* cited by examiner

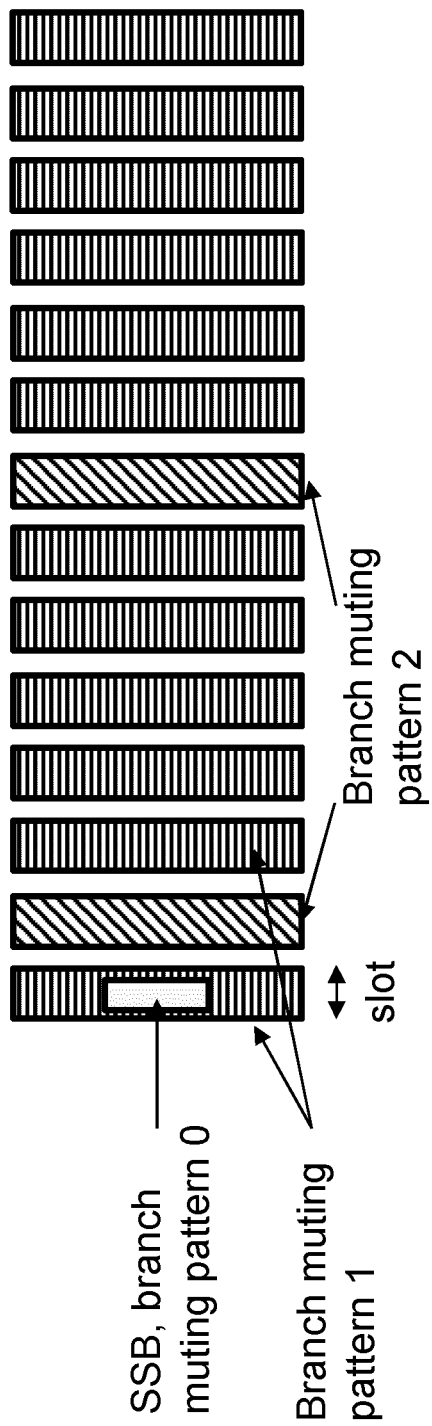

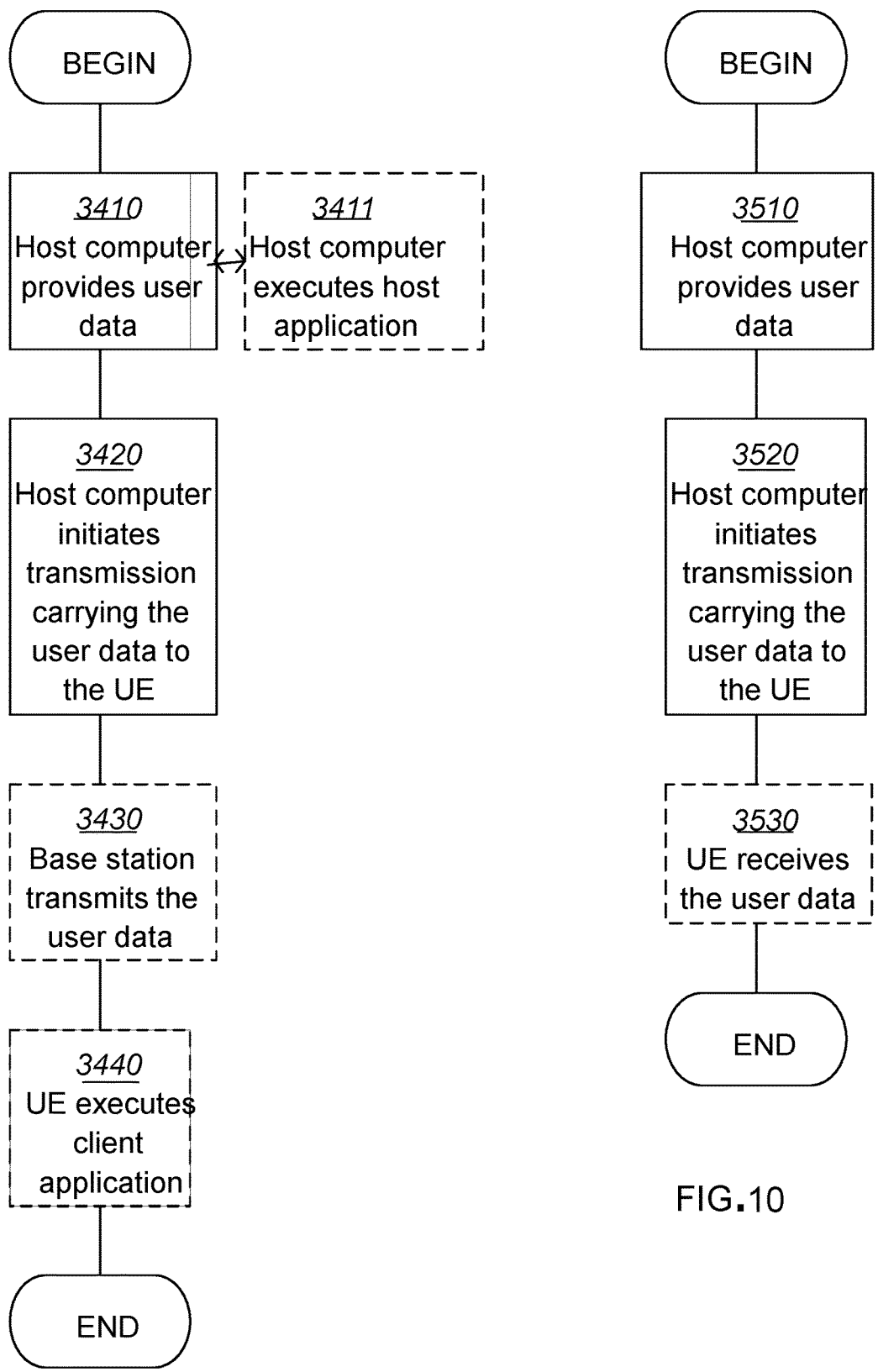

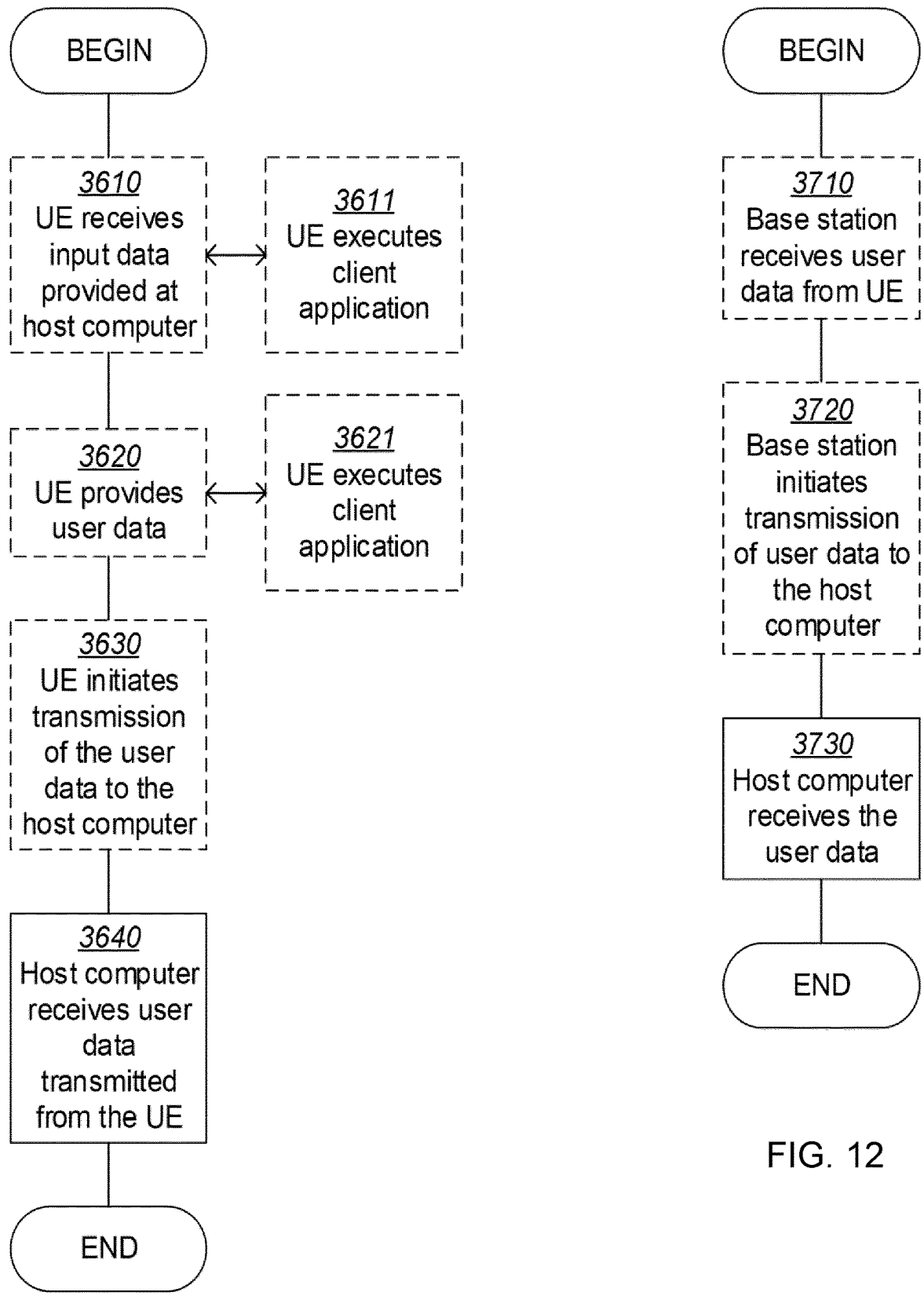

RADIO NETWORK NODE, AND METHOD PERFORMED THEREIN

CROSS-REFERENCE TO RELATED APPLICATION

This application is a Submission Under 35 U.S.C. § 371 for U.S. National Stage Patent Application of International Application Number: PCT/EP2021/066183, filed Jun. 16, 2021 entitled "RADIO NETWORK NODE, AND METHOD PERFORMED THEREIN," the entirety of which is incorporated herein by reference.

TECHNICAL FIELD

Embodiments herein relate to a radio network node, and a method performed therein for communication. Furthermore, a computer program and a computer readable storage medium are also provided herein. In particular, embodiments herein relate to communication in a wireless communication network in an energy efficient manner.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunications network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as developments for 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), focus is on a set of features such as the use of very many transmit- and receive-antenna elements that makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Antenna arrays are an important aspect of NR networks, allowing for beamforming of transmitted as well as received signals. In beamforming, multiple antenna elements are used to amplify the signal in a spatial direction by constructive interference, resulting in a directional gain and thereby a certain beam shape. The size of the array, i.e., the number of antenna elements used, thereby decides not only the total output power, by summing the contributions of the individual elements, but also the directional power gain of the signaling. As different scenarios will require different amounts of signal power to maintain an acceptable network (NW)-UE link quality, NW power usage can be decreased by muting parts of the antenna panel/radio hardware (HW) when possible. There have been solutions available to turning off transmitters/receiver units or antenna ports for other cellular technologies to save power at the network side. e.g., see KR100907973B1 and Zeid Al-Husseiny, "Energy Efficiency LTE Site Operation: with Antenna Muting and dynamic Psi-Omni", 2014, Uppsala University, Disciplinary Domain of Science and Technology, Technology, Department of Engineering Sciences, Signals and Systems Group. These solutions target a scenario when the number of antennas or antenna ports are small, e.g., 2-4 antenna ports. They turn off some of the transmitters/receiver units or antenna ports, e.g. using half of the transmitters, for transmission of all down physical signals/channels, or reception of all uplink signals/channels. Moreover, DL and UL can have different transmitters/receiver units or antenna ports muted considering the traffic load in order to optimize the power consumption, etc.

SUMMARY

Prior solutions, such as KR100907973B1 and Zeid Al-Husseiny, "Energy Efficiency LTE Site Operation: with Antenna Muting and dynamic Psi-Omni", 2014, Uppsala University, Disciplinary Domain of Science and Technology, Technology, Department of Engineering Sciences, Signals and Systems Group, are not designed for NR technologies, especially when the number of antenna elements or ports are big. In a typical NR scenario massive multiple input multiple output (MIMO) is used, wherein a large number of antennas may be used for beamforming, and 32, 64 antenna ports may be assumed. In some scenarios, more than 64 antenna ports may be used. The antenna branch muting solutions based on KR100907973B1 and Zeid Al-Husseiny, "Energy Efficiency LTE Site Operation: with Antenna Muting and dynamic Psi-Omni", 2014, Uppsala University, Disciplinary Domain of Science and Technology, Technology, Department of Engineering Sciences, Signals and Systems Group, require antenna branches to be muted for all channels, and the number of applicable muted antenna branches is limited to the channel that needs the most number of unmuted antenna branches. In current NR radio structure using Massive MIMO, the synchronization signal block (SSB) is transmitted with common beamforming to obtain the cell coverage. When half of the antenna panel is muted, the SSB should be power boosted by 3 dB to maintain the same output power for SSB. Furthermore, the precoding matrix for SSB should also be modified to keep the similar common beamforming shape. As an example, in a scenario where all antenna panel rows are required to avoid unwanted widening of the cell in the vertical direction, it would be recommended to alter the signal, to maintain the similar SSB coverage.

On the other hand, physical downlink shared channel (PDSCH) using channel state information (CSI)-reference signal (RS) beamforming may not be optimized if using the same antenna muting strategy as SSB, since SSB should be optimized for coverage while PDSCH may be optimized for cell throughput. Therefore, for the PDSCH beamforming, it is preferred to use different antenna muting strategies than when transmitting SSB.

To summarize, the coverage of the SSB may need to be strictly ensured by the network, while the requirement of physical downlink control channel (PDCCH) and PDSCH is less strict. Using one single setup for all channels does not consider that different channels may have different requirements, leading to sub-optimal beams. This means that the power saving benefits cannot be fully exploited or may cause unnecessary negative impact on network performance.

An object of embodiments herein is to provide a mechanism for handling communication in a wireless communication network in an energy efficient manner.

According to an aspect the object is achieved by a method performed by a radio network node for handling communication in a wireless communication network. The radio network node dynamically applies different muting patterns for muting an active component of one or more antenna branches of the radio network node and/or of one or more antenna panels of the radio network node. The different muting patterns are associated with one or more types of physical channels used for communicating and/or a communication parameter related to one or more UEs. The radio network node further performs a communication using the dynamically applied different muting patterns. Hence, the radio network node may mute an antenna array according to an antenna muting strategy, wherein the antenna muting strategy is based on the type of physical channel used for communication.

It is furthermore provided herein a computer program comprising instructions, which, when executed on at least one processor, cause the at least one processor to carry out any of the methods above, as performed by the radio network node. It is additionally provided herein a computer-readable storage medium, having stored thereon a computer program comprising instructions which, when executed on at least one processor, cause the at least one processor to carry out the method according to any of the methods above, as performed by the radio network node.

According to yet another aspect the object is achieved, according to embodiments herein, by providing a radio network node for handling communication in a wireless communication network. The radio network node dynamically applies different muting patterns for muting an active component of one or more antenna branches of the radio network node and/or of one or more antenna panels of the radio network node. The different muting patterns are associated with one or more types of physical channels used for communicating and/or a communication parameter related to one or more UEs. The radio network node is further configured to perform a communication using the dynamically applied different muting patterns.

Embodiments herein introduce a new functionality wherein energy performance of each physical channel may be optimized by considering the requirements and limitations of each physical channel, and thus dynamically applies, for example for different physical channel types, different muting patterns for muting one or more active components of one or more antenna branches of the radio network node and/or of one or more antenna panels of the radio network node.

Embodiments herein take into account the hardware realization of antenna branch muting, and allow for adopting different antenna branch muting patterns for different signals/channels to fulfil different radiation, coverage, and performance requirements. This reduces energy consumption in the radio network node while ensuring the coverage, compared with all channels using a fixed branch muting pattern, thus, leading to an optimized and improved energy efficiency in the wireless communication network.

BRIEF DESCRIPTION OF THE DRAWINGS

Embodiments will now be described in more detail in relation to the enclosed drawings, in which:

FIG. 5b is a schematic overview depicting applying different muting patterns according to embodiments herein;

FIGS. 9-12 are flowcharts illustrating methods implemented in a communication system including a host computer, a base station and a user equipment.

DETAILED DESCRIPTION

Figure 1:
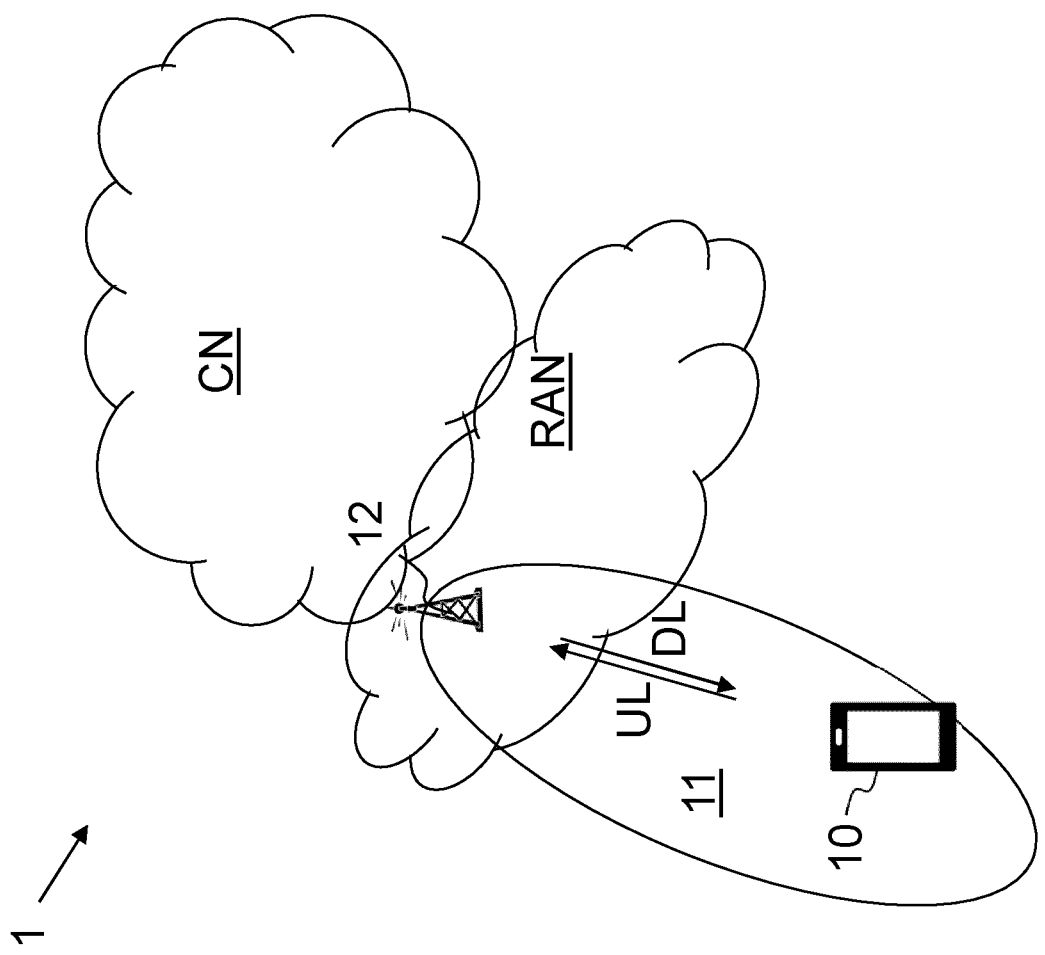
FIG. 1 is a schematic overview depicting a communication network according to embodiments herein.

Embodiments herein relate to communication networks in general. FIG. 1 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, NR, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, devices such as user equipment (UE) 10 e.g. a mobile station, a non-access point (non-AP) STA, a STA, a wireless device and/or a wireless terminal, communicate via one or more Access Networks (AN), e.g. RAN, to one or more core networks (CN). It should be understood by those skilled in the art that "UE" is a non-limiting term which means any terminal, wireless communication terminal, internet of things (IoT) capable device, Machine Type Communication (MTC) device, Device to Device (D2D) terminal, or node e.g. smart phone, laptop, mobile phone, sensor, relay, mobile tablets or even a base station communicating within a cell.

The communication network 1 comprises a radio network node 12 providing radio coverage over a geographical area, a first service area, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNB, a base transceiver station, Access Point Base Station, base station router, a transmission arrangement of a radio base station, a stand-alone access point or any other network unit capable of serving a UE within the service area served by the radio network node 12 depending e.g. on the first radio access technology and terminology used. The radio network node 12 comprises one or more antenna panels comprising a number of antenna branches that may be arranged in vertical columns and horizontal rows.

In NR technology and in some other systems, different physical signals/channels are designed to be transmitted and received through different transmission schemes and motivations, see 3GPP TS 38.211 NR Physical channels and modulation, v15.7.0. For instance, synchronization signal blocks (SSB) are transmitted in a broadcast way, so as to allow all UEs be able to decode and based on which to initiate an initial random access procedure. The transmit power and broadcast beamforming pattern(s) of SSB may be well adjusted to ensure its coverage. The SSB contains both synchronization signal and broadcast information such as Master Information Block (MIB), and they are in a predefined format. Thus, the ways to adjust coverage of SSB mainly lie on transmit power and broadcast beamforming pattern. Take another example, the PDSCH and PDCCH have different transmission schemes so their requirements of antenna branch muting may be different from the requirements of the SSB in order to reach an optimal performance. More specifically, the network may adjust the aggregation level of PDCCH to enable flexible adjustment of PDCCH coverage based on the requirement of the cell (larger aggregation level means better coverage with higher resource overhead, while lower aggregation level means high spectrum efficiency but with poor coverage). Meanwhile, the modulation order and coding rate for the PDSCH may be adjusted by the network based on the coverage requirement. In addition, a retransmission mechanism is supported so that when a UE fails to decode PDCCH and/or PDSCH, the network knows it by the acknowledge (ACK)/Non-acknowledge (NACK) feedback from the UE. Retransmission can then be performed by the network. UE combination of same PDSCH transmission information by different retransmission occasions may also be used to help improve the coverage of PDCCH and PDSCH.

According to embodiments herein, the radio network node 12 dynamically applies different muting patterns for muting active component(s), for example, turning off a power amplifier or similar, of one or more antenna branches of the radio network node 12 and/or of one or more antenna panels of the radio network node 12. Dynamically herein meaning that different muting patterns are applied over overlapping or different time periods such as slots, symbols or similar. The different muting patterns are associated with one or more types of physical channels used for communicating and/or a communication parameter related to one or more UEs 10. The radio network node 12 may thus apply a first muting pattern for a SSB transmission and a second muting pattern for a PDSCH transmission. In other words, the radio network node 12 may use different antenna muting strategies for different physical channels, wherein energy performance of each physical channel can be optimized by considering the requirements and limitations of each physical channel. This leads to an energy efficient communication in the wireless communication network 1.

Figure 2A:
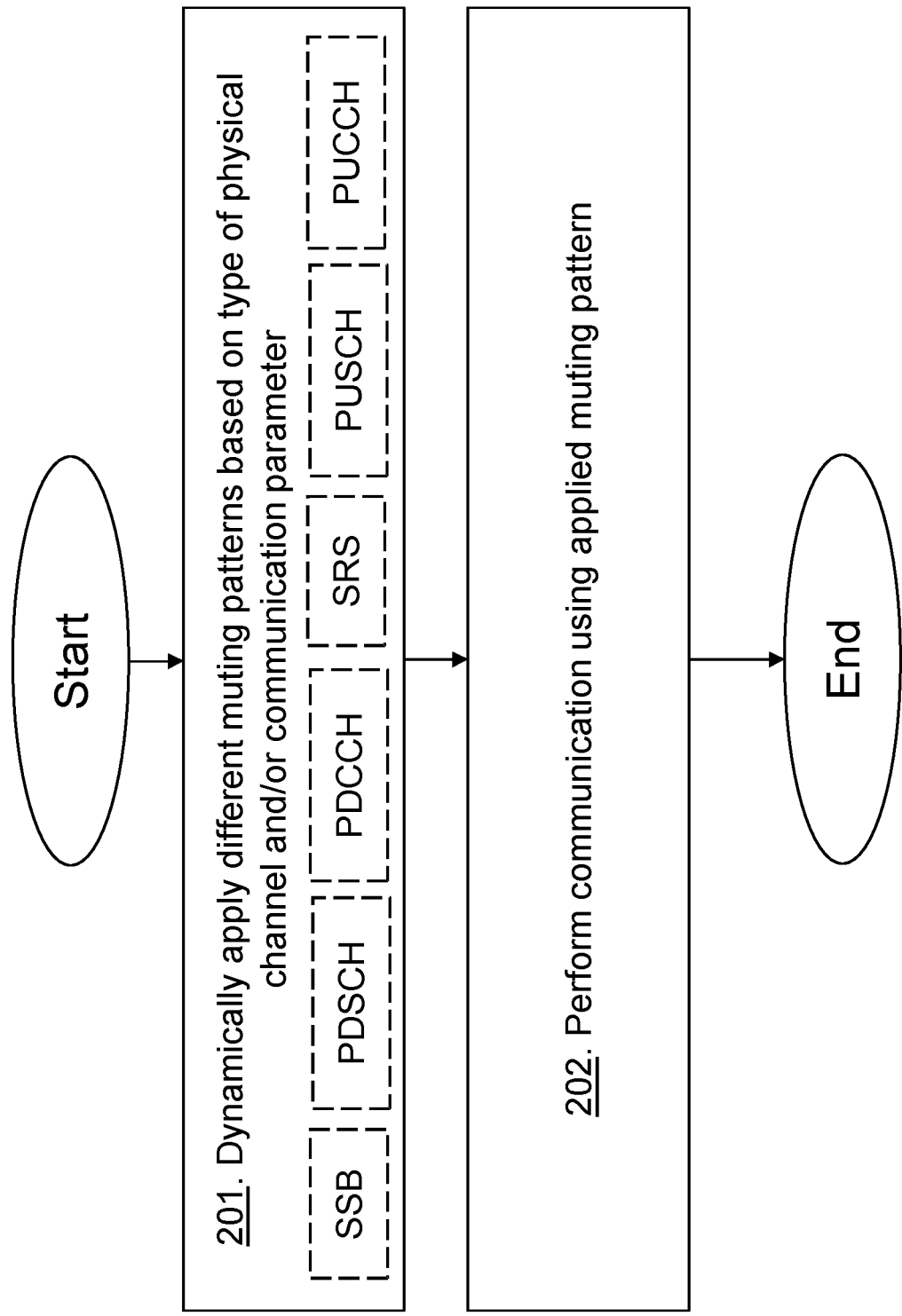
FIG. 2a is a schematic flowchart depicting a method performed by a radio network node according to embodiments herein.

The method actions performed by the radio network node 12 for handling or managing communication in the wireless communications network 1 according to embodiments herein will now be described with reference to a flowchart depicted in FIG. 2*a*. Optional actions are marked in dashed boxes.

Action 201. The radio network node 12 dynamically applies different muting patterns for muting the active component of one or more antenna branches of the radio network node 12 and/or of one or more antenna panels of the radio network node 12. The different muting patterns are associated with one or more types of physical channels used for communicating and/or a communication parameter related to one or more UEs 10. For example, a respective muting pattern of the different muting patterns may be associated with a respective type of physical channel such as a PDSCH muting pattern is applied for PDSCH and a SSB muting pattern is applied for SSB. The respective muting pattern may take into account one or more radio resources used by the respective type of physical channel, thus, using radio resources efficiently. The different muting patterns may be defined for different types of physical channels or signals indicating type of physical channel and the different muting patterns mute different active components for different physical channels, such as PDSCH, PDCCH, physical broadcast channel (PBCH), SSB, physical uplink control channel (PUCCH), physical random access channel (PRACH), or physical signals such as CSI-RS, primary synchronization signal (PSS), secondary synchronization signal (SSS), phase tracking reference signal (PTRS), sounding reference signal (SRS), positioning reference signal (PRS), etc. The radio network node 12 may apply different muting patterns based on the one or more communication parameters. The one or more communication parameters may comprise one or more of the following: a signal strength or quality of the one or more UEs; a radio coverage related to the one or more UEs; a parameter associated with a beam forming of a signal, a coding of the communication associated with the one or more UEs; and a location of the one or more UEs using the type of physical channel. Thus, the muting pattern used may include for example beam shape. Hence, if more columns are used in a muting pattern the beam may be narrower (more freedom) in the horizontal domain, and if more rows are used in a muting pattern, the beam may be narrow (more freedom) in the vertical domain. The radio network node 12 may for example apply a first muting pattern applied for a first type of physical channel for communicating data traffic that uses more columns and/or rows of antenna branches of the radio network node and/or of one or more antenna panels of the radio network node than a second muting pattern applied for a second type of physical channel for communicating synchronization signals or reference signals, for example, using a muting pattern for SSB or PRACH that uses more rows of the antenna panel than muting pattern for PDSCH. Active components to turn off may be radio hardware (HW) components/functions. For example; turning off power amplifier (PA) in analog front end (AFE) for the antenna port, turning off low noise amplifier (LNA) in the AFE for the antenna port, and/or using clock gating for the Radio ASIC that controls the antenna port, and/or turning off digital to radio frequency (D2RF) ASIC. It should be noted that a respective muting pattern of the different muting patterns may be associated with different physical channels in a same slot or symbol, thus leading to a fast and more flexible muting solution. The radio network node 12 may dynamically apply different muting patterns by using different muting patterns to communicate with different UEs at a same time slot or symbol, or sequential time slots or symbols.

Action 202. The radio network node 12 performs a communication using the dynamically applied different muting patterns. The radio network node may perform the communication by muting one or more antenna branches for receiving communication from the UE, and/or by muting one or more antenna branches for transmitting communication to the UE. The radio network node 12 may thus mute different parts of the antenna panels in DL and/or in UL.

By applying different muting patterns of one or more antenna branches to different physical channels and/or different communication parameters of the UE, a massive multiple input multiple output, MIMO, sleep may balance the requirements of energy saving performance and different physical channel transmission requirements. The antenna muting patterns may be applied when the antenna system is in a sleep mode also known as energy saving mode. The sleep mode may be triggered and controlled by an external logic, e.g. triggered when a low number of connected UEs 10 is present or a low PRB utilization.

Figure 2B:
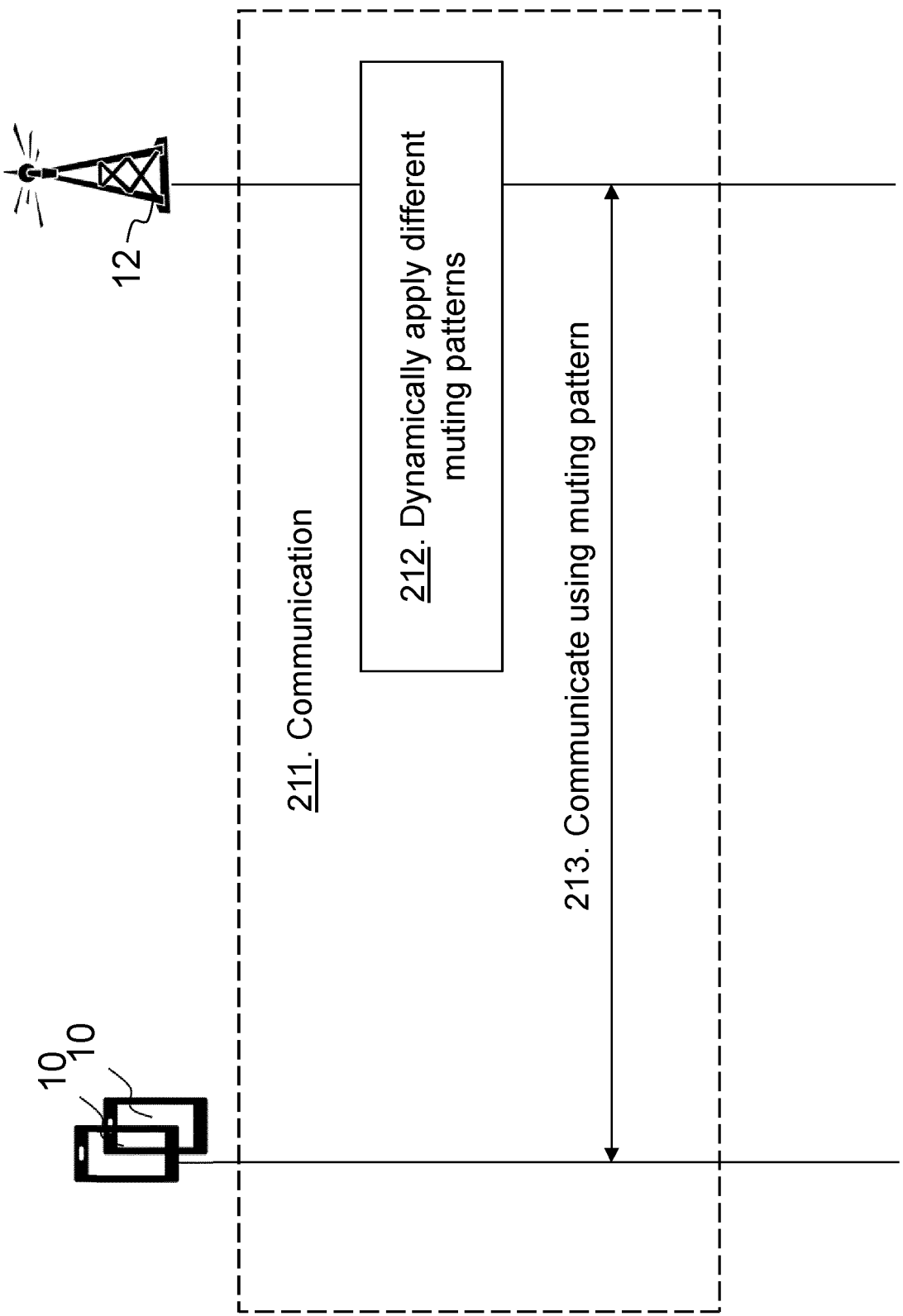
FIG. 2b is a combined flowchart and signalling scheme according to embodiments herein.

FIG. 2b is a combined flowchart and signalling scheme according to some embodiments herein.

Action 211. The radio network node 12 is communicating with one or more UE such as the UE 10.

Action 212. The radio network node 12 dynamically applies different muting patterns for muting the active component of one or more antenna branches of the radio network node, for example, muting one or more branches of an antenna panel of the radio network node. Thus, the radio network node 12 may apply a first muting pattern for symbols used for a first type of physical channel such as a SSB transmission, apply a second muting pattern for symbols used for a second type of physical channel such as a PDCCH transmission, and may apply a third muting pattern for symbols used for a third type of physical channel such as a PDSCH transmission. Thus, each muting pattern is associated with one or more types of physical channels used for communicating. Alternatively or additionally, each muting pattern may be associated with different one or more communication parameters related to one or more UEs. For example, the radio network node 12 may apply a first muting pattern for symbols used for a UE at a location at a border of a cell with weak signal strength and may apply a second muting pattern for symbols used for a UE at a location close to the radio network node with a strong signal strength. The radio network node 12 may apply different muting patterns over different slots or a same slot.

Action 213. The radio network node 12 then performs a communication using the dynamically applied different muting patterns. The radio network node 12 may thus use different muting patterns to communicate with different UEs at a same time slot or symbol, or sequential time slots or symbols.

Figure 3A:
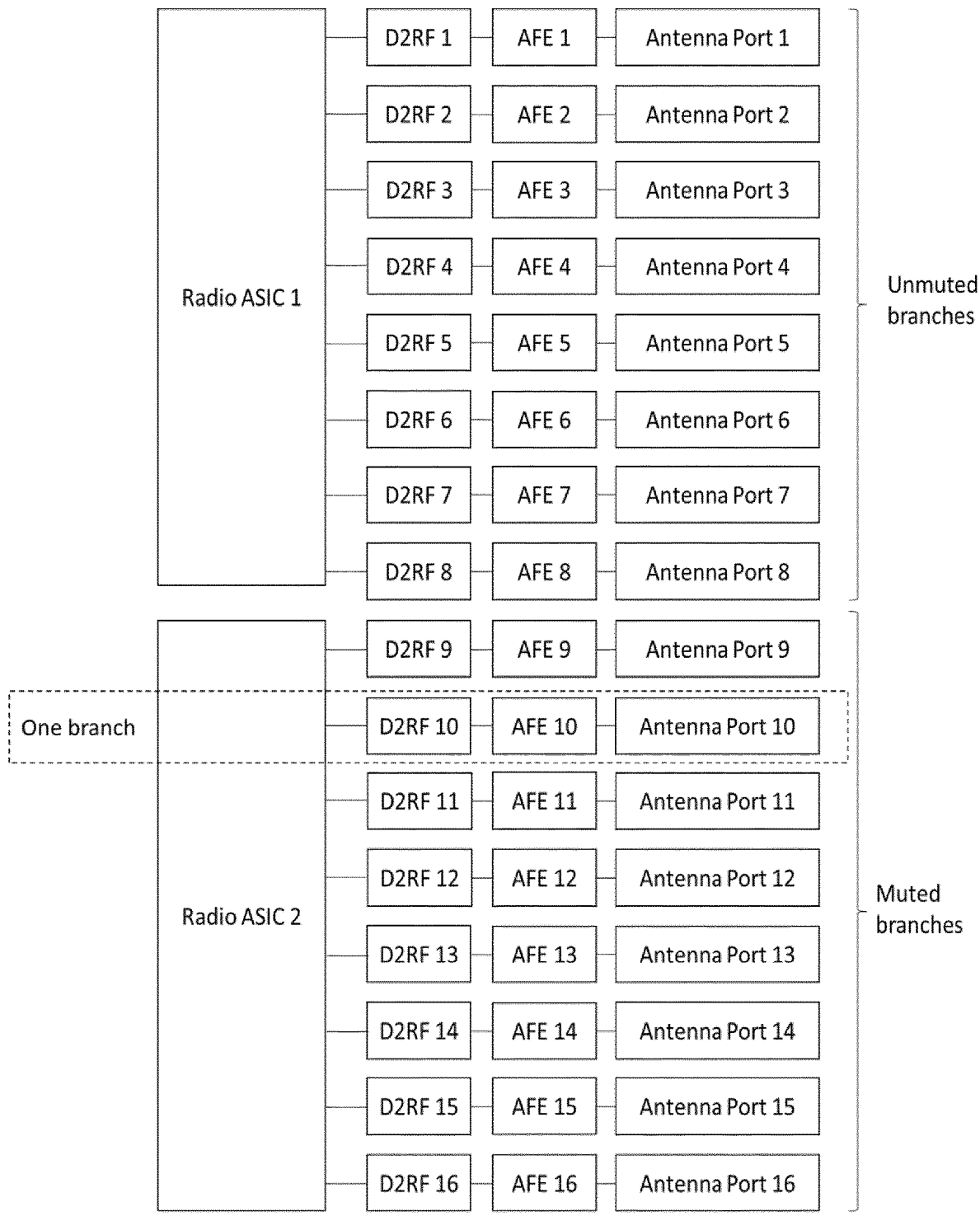
FIGS. 3a-3c show different muting patterns according to embodiments herein.
Figure 3B:
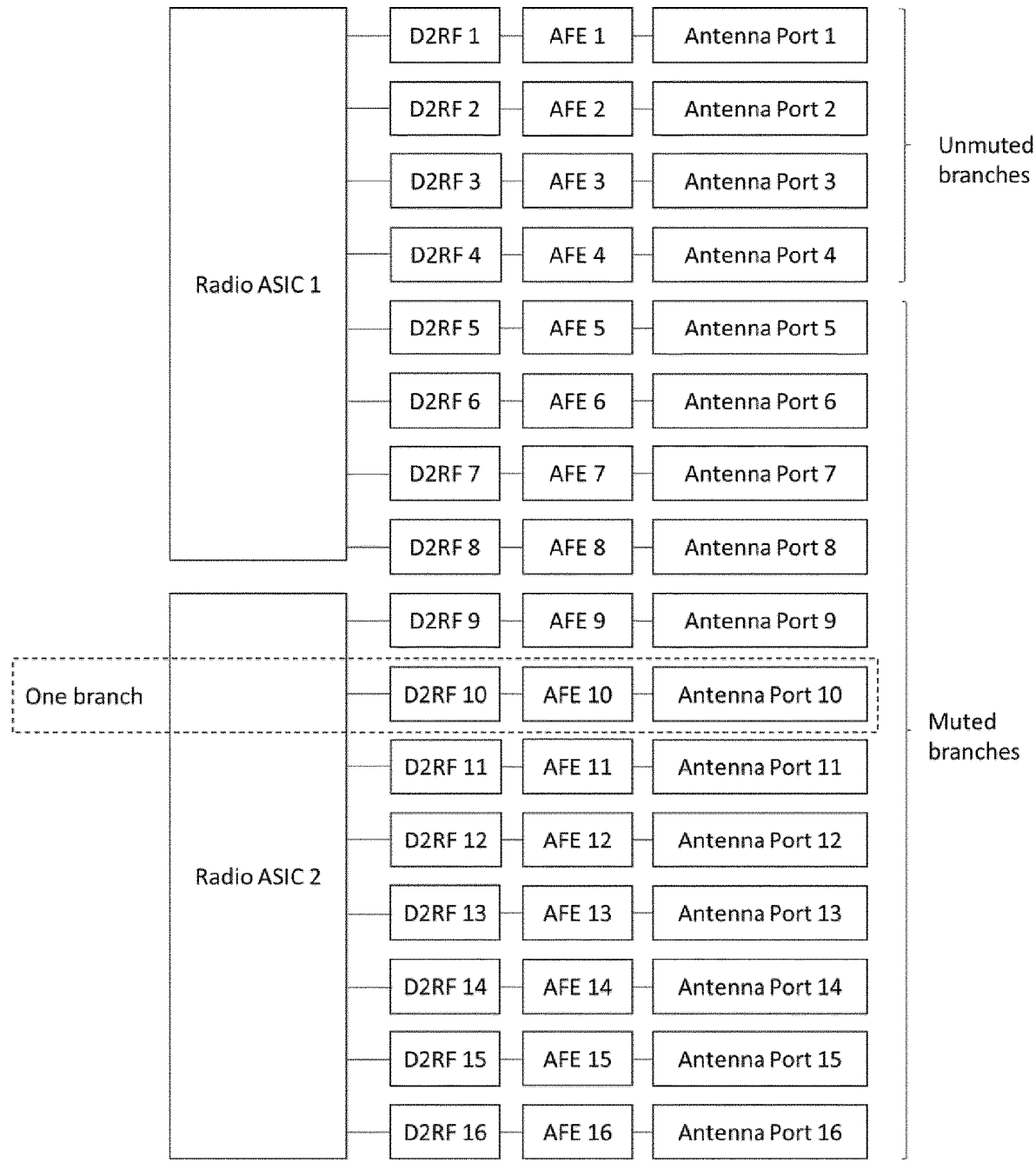
Figure 3C:
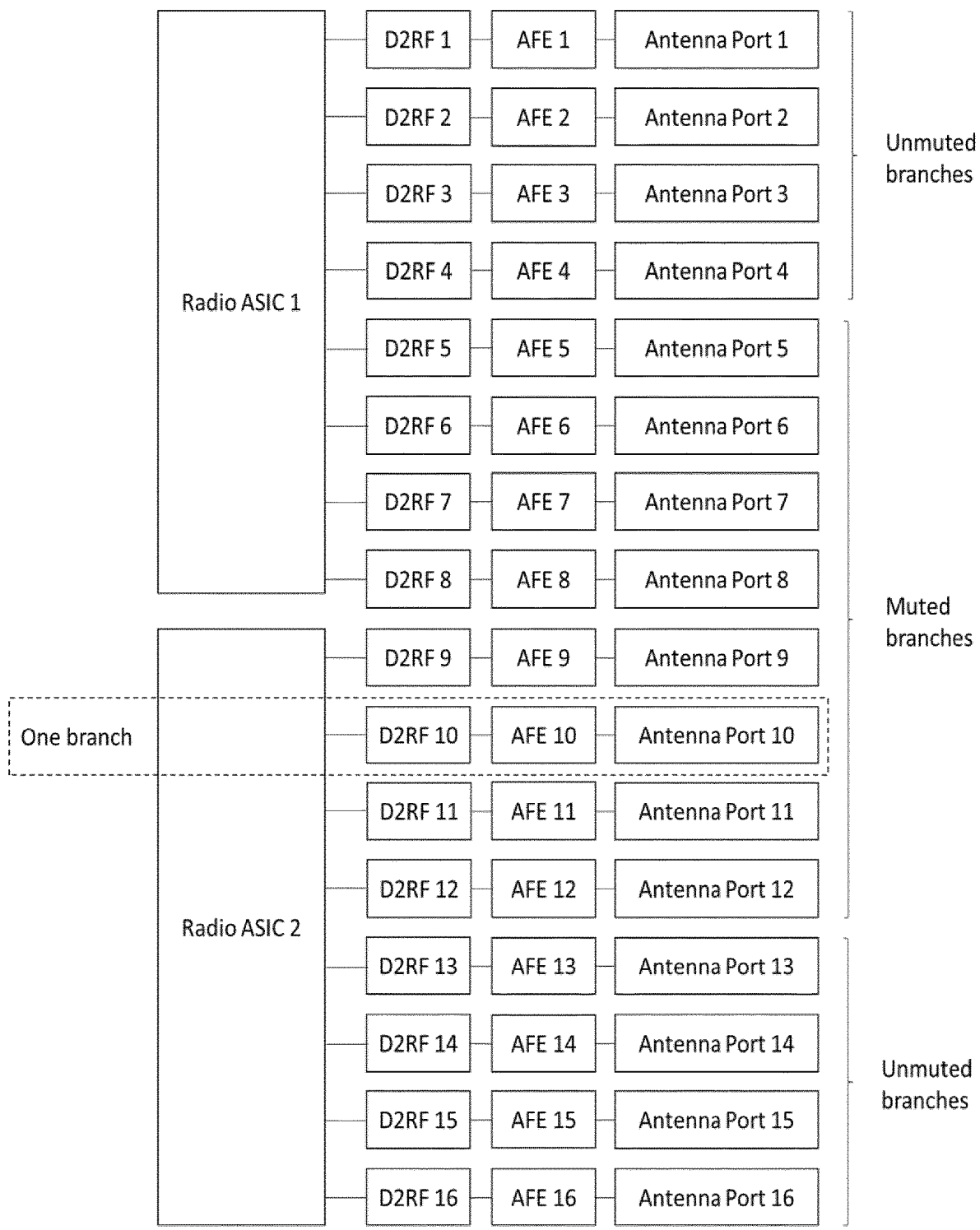

Definition of muting patterns: The branch muting operation in the radio network node 12 may include turning off relevant active components i.e. components that are powered and used, for example, radio hardware (HW) components/functions. For example; turning off power amplifier (PA) in analog front end (AFE) for the antenna port, turning off low noise amplifier (LNA) in the AFE for the antenna port, and/or using clock gating for the Radio ASIC that controls the antenna port, and/or turning off digital to radio frequency (D2RF) ASIC, i.e., transmission (TRX) ASIC for the antenna port, and/or turning off functions of beamforming in the Digital beamforming (BF) ASIC for muted antenna port or related active components, etc. AFE usually includes PA, LNA, filter units, etc. connecting to antennas, but may not include antennas. Different muting patterns are shown in FIGS. 3a-3c. For the branch muting pattern 0 (see FIG. 3a) and branch muting pattern 2 (see FIG. 3c), the number of muted branches is the same, but the indices for muted antenna branches are different, which means different rows/columns may be muted between the different muting patterns. For the branch muting pattern 1 (see FIG. 3b), the number of muted antenna branches is smaller than branch muting pattern 0 and branch muting pattern 2.

Different physical channels are allowed to be used for transmission or reception, also referred to as transmitted or received, through same or different physical antenna branches. It is herein suggested to use same or different muting patterns to different physical channels to improve the energy efficiency and meanwhile achieve acceptable performance for each physical channel. Usually, SSB requires wider beam coverage, lower gain, but more antenna branches, while PDSCH and PDCCH require narrower beam coverage, higher gain, but fewer antenna branches. Thus, for DL, SSB can use one muting pattern with more antenna branches on and possibly with extra power boosting, while PDSCH and/or PDCCH may use another muting pattern with fewer antenna branches on. In addition, SSB is only transmitted periodically and sparsely in time, while in majority of time, the radio network node 12 transmits PDSCH and PDCCH. Therefore, SSB with more antenna branches on can be transmitted fewer times and PDSCH and/or PDCCH with fewer antenna branches on may be transmitted with the majority time when the radio network node 12 is in the energy saving mode.

Figure 4:
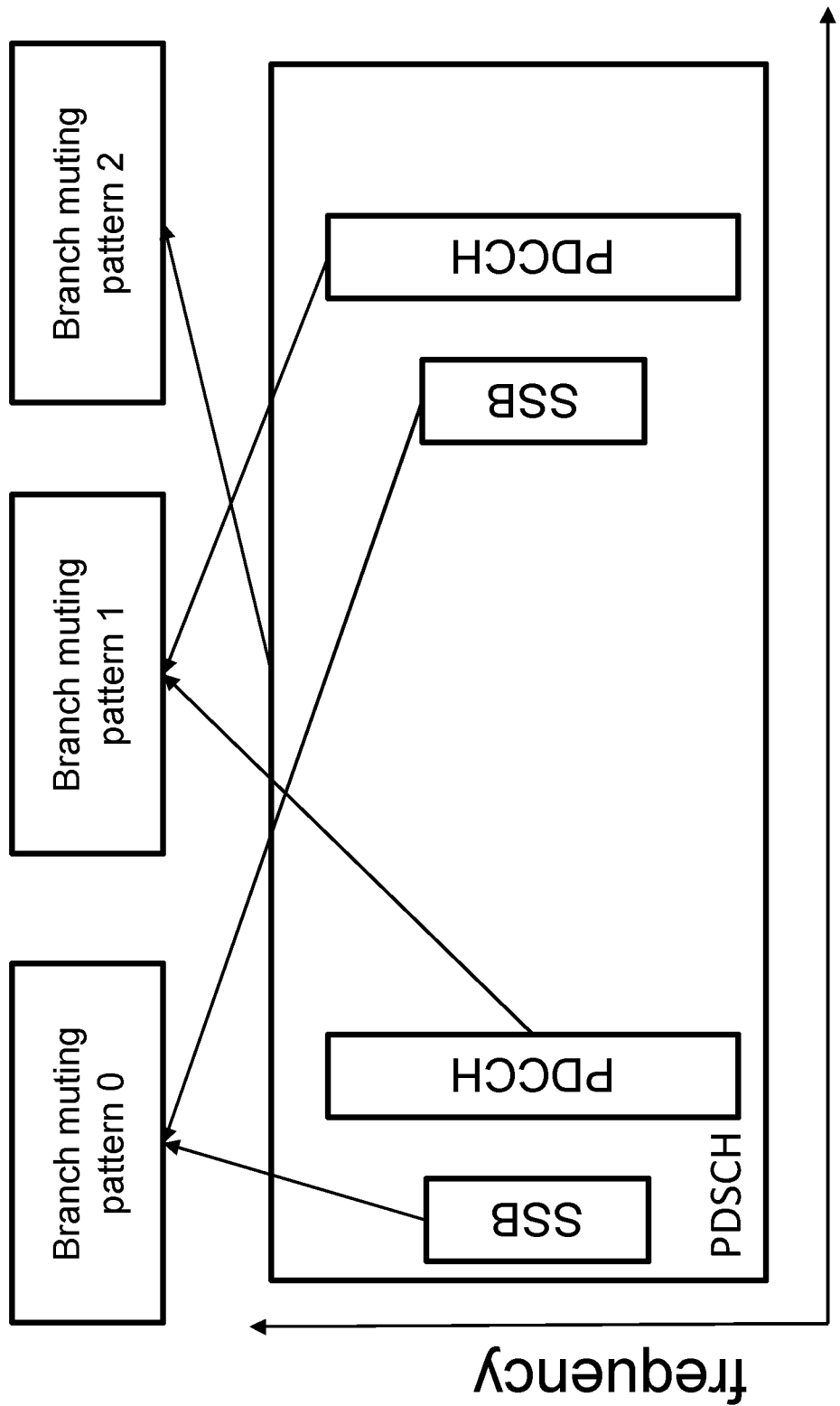
FIG. 4 is a schematic illustration depicting radio resources used by different muting patterns.

Considering the minimum downlink transmission time-domain granularity for NR is a symbol, i.e. orthogonal frequency division multiplex (OFDM) symbol, so it is most power efficient to adjust the muting pattern for each OFDM symbol in a slot based on the information carried by that symbol. Hence, one branch muting pattern may be used for symbols used for SSB transmission, a different muting pattern for symbols used for PDCCH transmission, and another muting pattern for symbols used for PDSCH, see FIG. 4.

Beam weights, such as amplitude and phase shifts for the antenna elements, designed to match the original SSB beam shape(s) may be used. Moreover, if needed in order to maintain the coverage of each physical channel, power boosting may be used for required channels. For example, SSB coverage can be maintained with 3 dB power boosting if only half of the antenna branches are used for transmitting the SSB.

As an example, the SSB is transmitted with muting pattern 0 shown in FIG. 3a with 6 dB power boosting to maintain coverage. CSI-RS and PDSCH are instead transmitted with the muting pattern 1 shown in FIG. 3b, and PDCCH is transmitted with muting pattern 2, see FIG. 3c. Power boosting may be applied to CSI-RS, PDSCH, and PDCCH depending on the requirements on those channels. Possible Radio HW implementations for branch muting patterns are schematically shown in FIGS. 3a-3c.

Even though the symbol-based antenna muting is power efficient, it will also introduce complexity and signaling overhead between baseband and radio to adjust the power for each symbol. In order to reduce such complexity and overhead, it is also possible to adjust the muting pattern in slot level. Thus, it is herein suggested that the muting pattern may be changed dynamically for different channels within the same slot (e.g, for PDCCH and PDSCH in the same slots) or in different slots. For example, for the slot that contains SSB, the antenna muting pattern 0 is applied. For other slots without SSB, either muting pattern 0 or muting pattern 1 is applied. Thus, radio resources used by the physical channel may be used to determine muting pattern.

The wireless communication network can communicate to several UEs at the same time, e.g., using different frequency resources and/or using different beams.

Figure 5A:
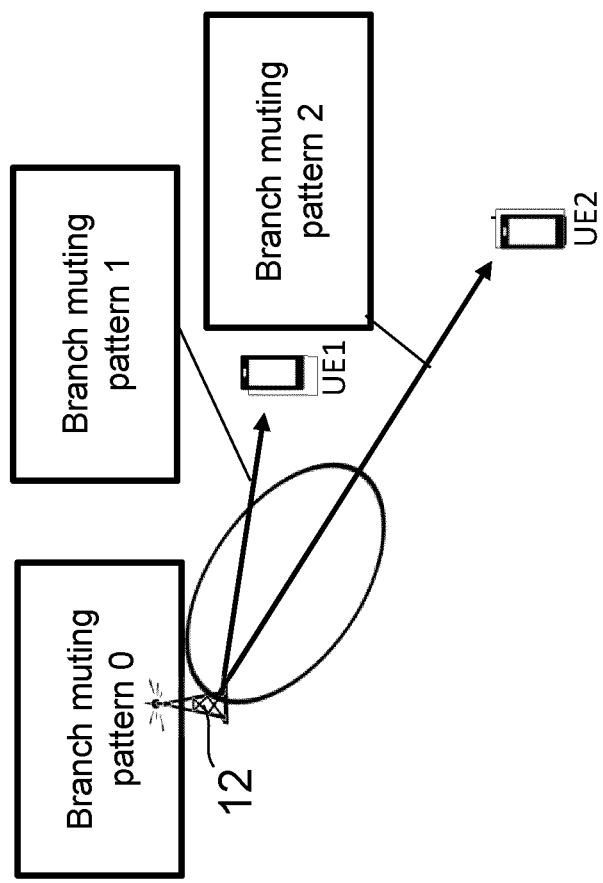
FIG. 5a is a schematic overview depicting applying different muting patterns according to embodiments herein.
Figure 5C:
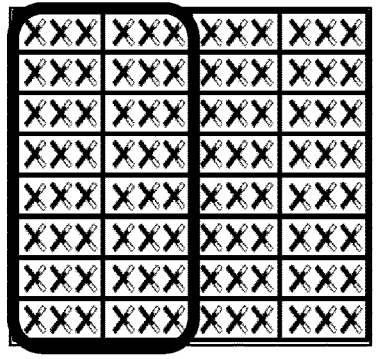
FIG. 5c is a schematic overview depicting different muting patterns on antenna panels according to embodiments herein.
Figure 5C:
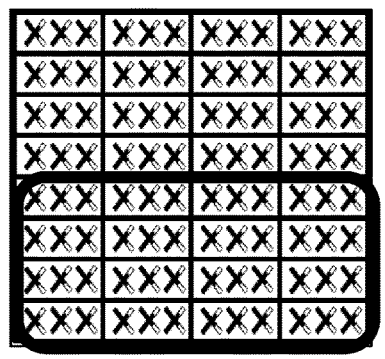
Figure 5C:
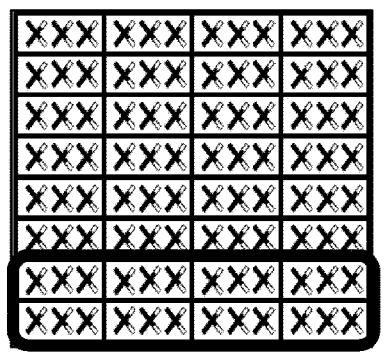

Different UEs may be with different coverage and data rate requirements, e.g., may be different for one UE located at cell center than for another UE located at cell edge. It is also possible to assign different muting patterns for transmissions to different UEs at the same time. As an example, see FIG. 5a: if there are two UEs, the UE-specific CSI-RS, the PDCCH and the PDSCH for UE1, are transmitted through muting pattern 1 and the UE-specific CSI-RS, the PDCCH and the PDSCH for UE2, are transmitted through muting pattern 2. The cell wide signals like SSB and PDCCH carried on cell wide beam, is transmitted through muting pattern 0. Such design would help to even simplify the muting pattern determination procedure. Thus, using different muting patterns to communicate with different UEs at the same time is also beneficial. The muting patterns used may be based on location of the UEs that the network need to communicate with at the same time. Certainly, it is also possible to assign different muting patterns for transmissions to different UEs at different times. Thus, embodiments herein may provide a solution wherein the radio network node 12 may dynamically apply different muting patterns by using different muting patterns to communicate with different UEs at a same time slot or symbol, or sequential time slots or symbols, see FIG. 5b. In FIG. 5c, the SSB is transmitted using the branch muting pattern 0 (white box) in a first slot. In the same slot the radio network node 12 is transmitting a physical channel using the branch muting pattern 1, shown horizontally striped. The radio network node 12 is further in some slots transmitting a physical channel using the branch muting pattern 2, shown as diagonally striped.

Similarly, as the downlink transmission, the uplink reception signal/channels may also be designed with different requirements and transmission schemes, allowing different muting patterns for different uplink signals and channels. Thus, any of the previous embodiments, may be used to vary muting patterns also for UL channels. In one example, for the transmission of SSB and reception of physical random access channel (PRACH) the radio network node 12 may use branch muting pattern 0, see FIG. 3a, while for the transmission of PDSCH and PDCCH and for the reception of SRS, PUCCH, and physical uplink shared channel (PUSCH) the radio network node 12 may use branch muting pattern 1, see FIG. 3b. Thus, embodiments herein may provide a solution wherein the radio network node 12 may perform the communication by muting one or more antenna branches for receiving communication from a UE, and/or by muting one or more antenna branches for transmitting communication to the UE.

FIG. 5c discloses different muting patterns denoted as branch muting patterns. It is illustrated how the different branch muting patterns mute different row and columns of the one or more antenna panels of the radio network node 12. Thus, a first muting pattern applied for a first type of physical channel for communicating data traffic may use more columns and/or rows of antenna branches of the radio network node 12 and/or of one or more antenna panels of the radio network node 12, than a second muting pattern applied for a second type of physical channel for communicating synchronization signals or reference signals.

Figure 6:
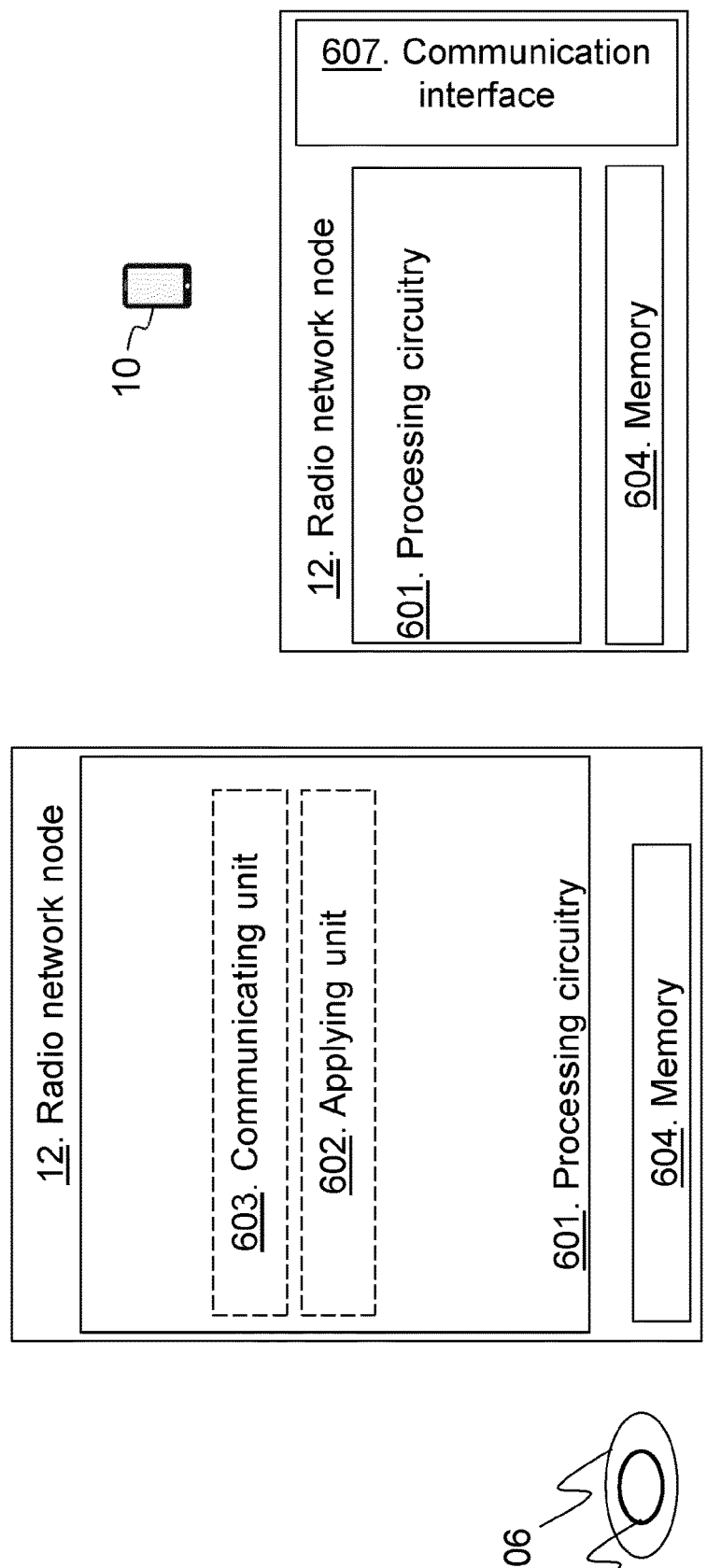
FIG. 6 is a block diagram depicting radio network nodes according to embodiments herein.

FIG. 6 shows a block diagram depicting the radio network node 12 in two embodiments for enabling or handling communication in the wireless communication network.

The radio network node 12 may comprise processing circuitry 601, e.g. one or more processors, configured to perform the methods herein.

The radio network node 12 may comprise an applying unit 602, e.g. a scheduling or configuring unit or similar. The radio network node 12, the processing circuitry 601, and/or the applying unit 602 is configured to dynamically apply different muting patterns for muting an active component of the one or more antenna branches of the radio network node and/or of the one or more antenna panels of the radio network node. The different muting patterns are associated with one or more types of physical channels used for communicating and/or a communication parameter related to one or more UEs. The respective muting pattern of the different muting patterns may be associated with the respective type of physical channel. The respective muting pattern is taking into account one or more radio resources used by the type of physical channel. As stated, the different muting patterns may be associated with the communication parameter related to one or more UEs, wherein the communication parameter may comprise one or more of the following: a signal strength or quality of the one or more UEs; a radio coverage related to the one or more UEs; a parameter associated with a beam forming of a signal, a coding of the communication associated with the one or more UEs; and a location of the one or more UEs using the type of physical channel. Thus, different muting patterns may be applied depending on beams or signal strength of a UE.

The different muting patterns may be defined for different types of physical channels and the different muting patterns may mute different active components for different physical channels or physical signals such as PDSCH, PDCCH, PBCH, SSB, PUCCH, PRACH, PSS, SSS, CSI-RS, PTRS, SRS, PRS, etc. . . . The respective muting pattern of the different muting patterns may be associated with different physical channels in a same slot or symbol. The radio network node 12, the processing circuitry 601, and/or the applying unit 602 may be configured to dynamically apply different muting patterns by using different muting patterns to communicate with different UEs at a same time slot or symbol, or sequential time slots or symbols.

The radio network node 12 may comprise a communicating unit 603, e.g. a receiver, a transmitter, a transceiver or similar. The radio network node 12, the processing circuitry 601, and/or the communicating unit 603 is configured to perform the communication using the dynamically applied different muting patterns. It should herein be noted that a first muting pattern applied for a first type of physical channel for communicating data traffic may use more columns and/or rows of antenna branches of the radio network node 12 and/or of one or more antenna panels of the radio network node 12, than a second muting pattern applied for a second type of physical channel for communicating synchronization signals or reference signals. The radio network node 12, the processing circuitry 601, and/or the communicating unit 603 may be configured to perform the communication by muting one or more antenna branches for receiving communication from a UE, and/or muting one or more antenna branches for transmitting communication to the UE.

The radio network node 12 further comprises a memory 604. The memory comprises one or more units to be used to store data on, such as indications, slice information, strengths or qualities, indications, reconfiguration, sleep mode configurations, values, scheduling information, timers, applications to perform the methods disclosed herein when being executed, and similar. The radio network node 12 comprises a communication interface 607 comprising transmitter, receiver, transceiver and/or one or more antennas in one or more antenna panels. Thus, it is herein provided the radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

The methods according to the embodiments described herein for the radio network node 12 are respectively implemented by means of e.g. a computer program product 605 or a computer program product, comprising instructions, i.e., software code portions, which, when executed on at least one processor, cause the at least one processor to carry out the actions described herein, as performed by the radio network node 12. The computer program product 605 may be stored on a computer-readable storage medium 606, e.g. a universal serial bus (USB) stick, a disc or similar. The computer-readable storage medium 606, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

Figure 7:
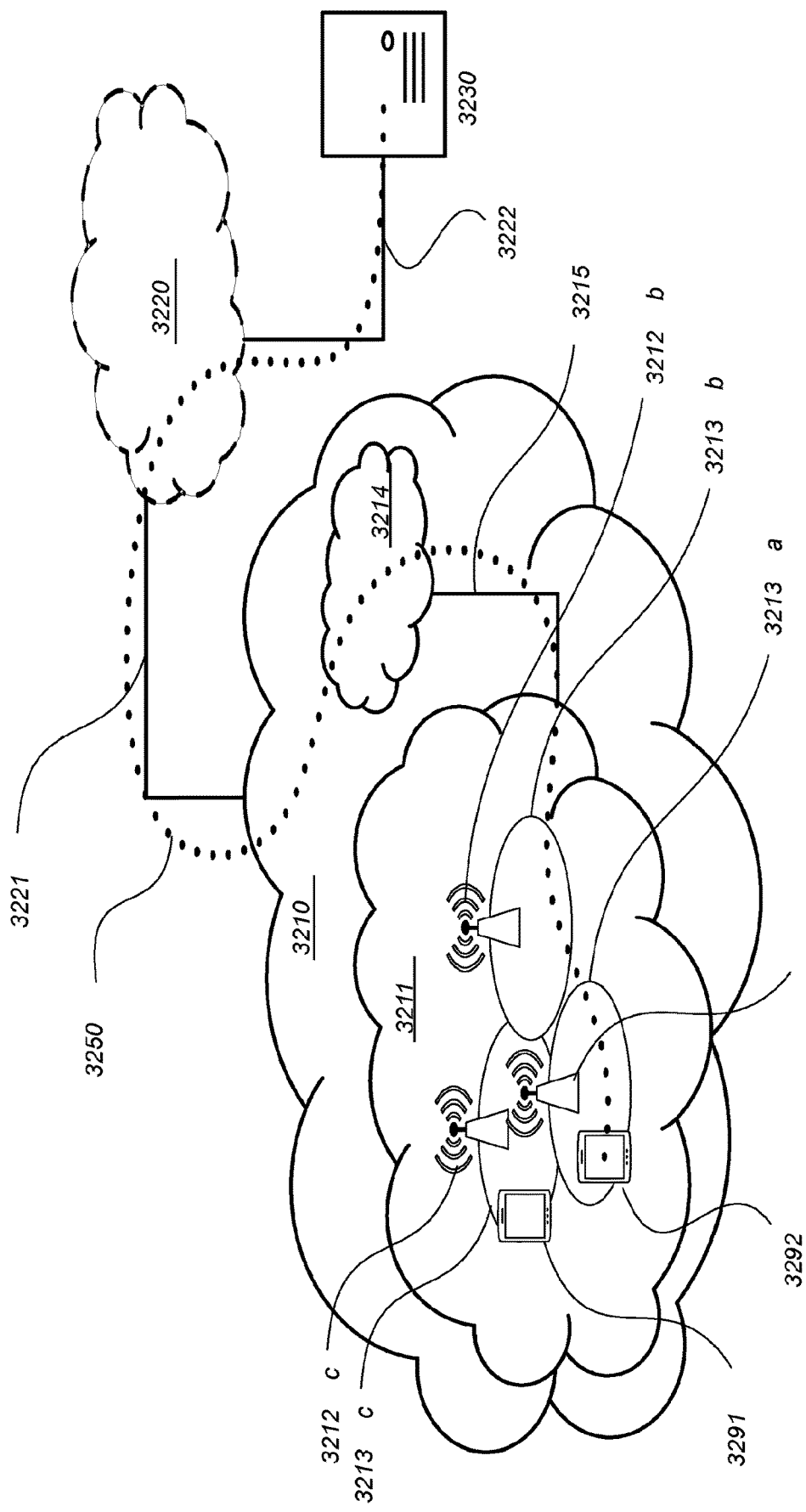
FIG. 7 schematically illustrates a telecommunication network connected via an intermediate network to a host computer.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
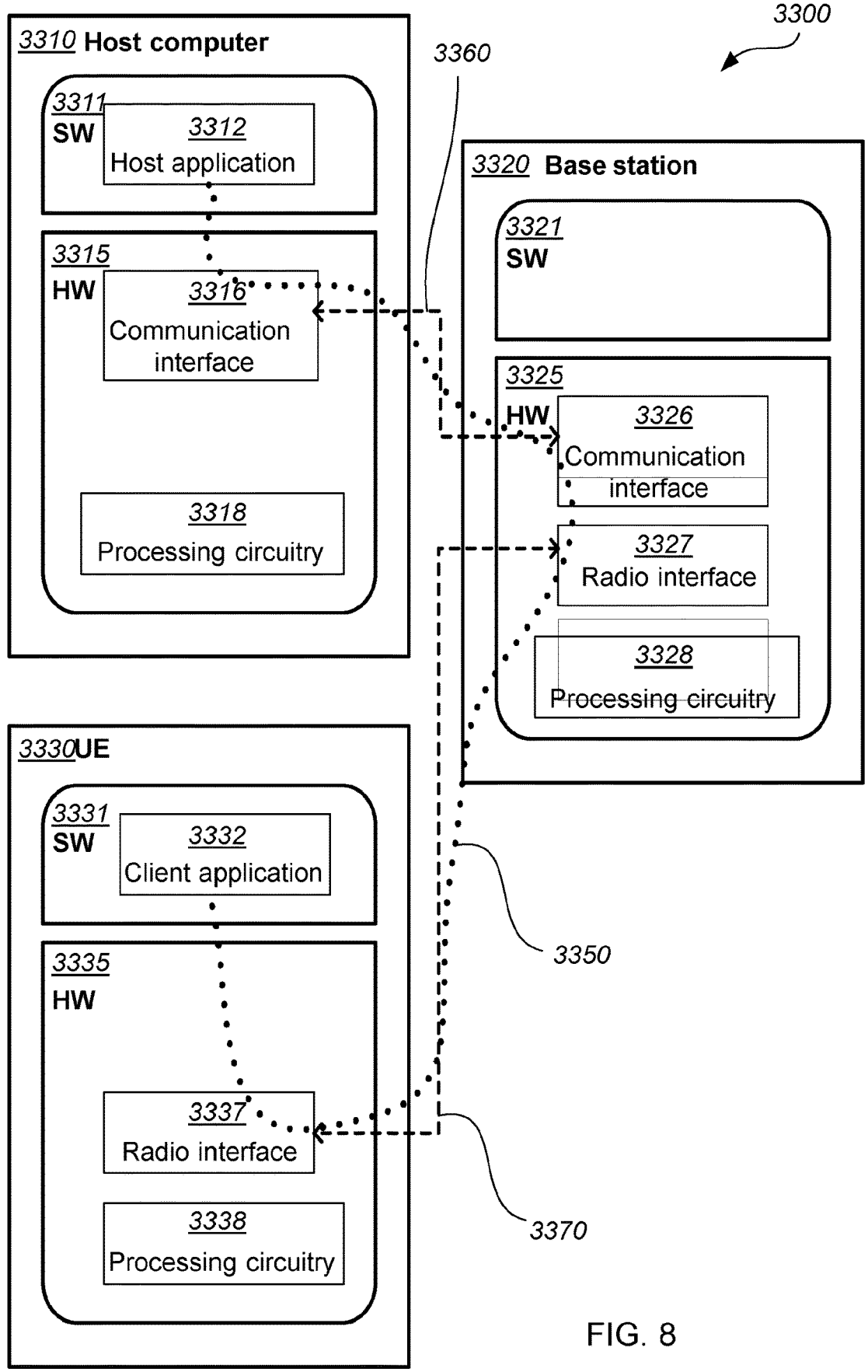
FIG. 8 is a generalized block diagram of a host computer communicating via a base station with a user equipment over a partially wireless connection.

FIG. 8 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible a more energy efficient communication and thus leading to an improved battery time, and more efficient energy consumption.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12 show methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication in a wireless communication network, the method comprising:
   dynamically applying different muting patterns for muting an active component of one of both of one or more antenna branches of the radio network node and of one or more antenna panels of the radio network node, the different muting patterns being associated with one or both of one or more types of physical channels used for communicating and a communication parameter related to one or more user equipments, UEs, a respective muting pattern of the different muting patterns being associated with a respective type of physical channel, and the different muting patterns being associated with different physical channels in a same slot or symbol; and
   performing a communication using the dynamically applied different muting patterns.

2. The method according to claim 1, wherein the respective muting pattern takes into account one or more radio resources used by the respective type of physical channel.

3. The method according to claim 1, wherein the communication parameter comprises one or more of the following: a signal strength or quality of the one or more UEs; a radio coverage related to the one or more UEs; a parameter associated with a beam forming of a signal, a coding of the communication associated with the one or more UEs; and a location of the one or more UEs using the type of physical channel.

4. The method according to claim 1, wherein the different muting patterns are defined for different types of physical channels or physical signals indicating type of physical channel and the different muting patterns mute different active components for different physical channels or physical signals.

5. The method according to claim 1, wherein a first muting pattern applied for a first type of physical channel for communicating data traffic uses one or more of:
- more columns of one of both antenna branches and antenna panels of the radio network node;
- more rows of one or both of antenna branches and antenna panels of the radio network node,
- than a second muting pattern applied for a second type of physical channel for communicating synchronization signals or reference signals.

6. The method according to claim 1, wherein performing the communication comprises one or both muting one or more antenna branches for receiving communication from a UE, and muting one or more antenna branches for transmitting communication to the UE.

7. The method according to claim 1, wherein dynamically applying different muting patterns comprises using different muting patterns to communicate with different UEs at a same time slot or symbol, or sequential time slots or symbols.

8. A radio network node for handling communication in a wireless communication network, the radio network node comprising processing circuitry, the processing circuitry being configured to cause the radio network node to:
- dynamically apply different muting patterns for muting an active component of one or both of one or more antenna branches of the radio network node and of one or more antenna panels of the radio network node, the different muting patterns being associated with one or both of one or more types of physical channels used for communicating and a communication parameter related to one or more user equipments, UE, and a respective muting pattern of the different muting patterns being associated with a respective type of physical channel, and the different muting patterns being associated with different physical channels in a same slot or symbol; and
- perform a communication using the dynamically applied different muting patterns.

9. The radio network node according to claim 8, wherein the respective muting pattern takes into account one or more radio resources used by the type of physical channel.

10. The radio network node according to claim 8, wherein the communication parameter comprises one or more of the following: a signal strength or quality of the one or more UEs; a radio coverage related to the one or more UEs; a parameter associated with a beam forming of a signal, a coding of the communication associated with the one or more UEs; and a location of the one or more UEs using the type of physical channel.

11. The radio network node according to claim 8, wherein the different muting patterns are defined for different types of physical channels or physical signals and the different muting patterns mute different active components for different physical channels or physical signals.

12. The radio network node according to claim 8, wherein a first muting pattern applied for a first type of physical channel for communicating data traffic uses one or more of:
- more columns of one of both antenna branches and antenna panels of the radio network node;
- more rows of one or both of antenna branches and antenna panels of the radio network node,
- than a second muting pattern applied for a second type of physical channel for communicating synchronization signals or reference signals.

13. The radio network node according to claim 8, wherein the radio network node is configured to perform the communication by one or both muting one or more antenna branches for receiving communication from a UE, and muting one or more antenna branches for transmitting communication to the UE.

14. The radio network node according to claim 8, wherein the radio network node is configured to dynamically apply different muting patterns by using different muting patterns to communicate with different UEs at a same time slot or symbol, or sequential time slots or symbols.

15. A non-transitory computer storage medium storing a computer program comprising instructions, which, when executed on at least one processor, cause the at least one processor to perform a method, the method comprising:
- dynamically applying different muting patterns for muting an active component of one of both of one or more antenna branches of a radio network node and of one or more antenna panels of the radio network node, the different muting patterns being associated with one or both of one or more types of physical channels used for communicating and a communication parameter related to one or more user equipments, UEs, a respective muting pattern of the different muting patterns being associated with a respective type of physical channel, and the different muting patterns being associated with different physical channels in a same slot or symbol; and
- performing a communication using the dynamically applied different muting patterns.

16. The method according to claim 1, wherein a respective muting pattern of the different muting patterns is associated with an uplink or a downlink physical channel.

17. The method according to claim 16, wherein the respective muting pattern is different for an uplink physical channel and a downlink physical channel.

18. The radio network node according to claim 8, wherein a respective muting pattern of the different muting patterns is associated with an uplink or a downlink physical channel.

19. The radio network node according to claim 18, wherein the respective muting pattern is different for an uplink physical channel and a downlink physical channel.

* * * * *